United States Patent
Weigand et al.

(10) Patent No.: US 7,478,830 B2
(45) Date of Patent: Jan. 20, 2009

(54) GENERATOR SUPPORT FOR A DRIVER AIR BAG MODULE TO BE MOUNTED IN THE STEERING WHEEL OF A MOTOR VEHICLE

(75) Inventors: Steffen Weigand, Aschaffenburg (DE); Norbert Muller, Aschaffenburg (DE)

(73) Assignee: Takata-Petri AG (DE)

(*) Notice: Subject to any disclaimer, the term of this patent is extended or adjusted under 35 U.S.C. 154(b) by 0 days.

(21) Appl. No.: 11/779,676

(22) Filed: Jul. 18, 2007

(65) Prior Publication Data

US 2008/0012270 A1    Jan. 17, 2008

Related U.S. Application Data

(63) Continuation of application No. PCT/DE2006/000079, filed on Jan. 16, 2006.

(30) Foreign Application Priority Data

Jan. 18, 2005    (DE) .................. 10 2005 002 945

(51) Int. Cl.
*B60R 21/203* (2006.01)
*H01H 9/00* (2006.01)

(52) U.S. Cl. .................... 280/731; 200/61.54

(58) Field of Classification Search .............. 280/728.2, 280/731; 200/61.54, 61.55, 61.56, 61.57
See application file for complete search history.

(56) References Cited

U.S. PATENT DOCUMENTS

| | | | |
|---|---|---|---|
| 4,887,843 A | 12/1989 | Husby | |
| 5,593,177 A * | 1/1997 | Ricks | 280/731 |
| 5,650,600 A * | 7/1997 | Walters | 200/61.54 |
| 6,402,193 B1 | 6/2002 | Fleckenstein | |
| 6,871,870 B2 * | 3/2005 | Schneider et al. | 280/728.2 |
| 6,942,247 B2 * | 9/2005 | Simpson | 280/731 |
| 7,159,897 B2 * | 1/2007 | Worrell et al. | 280/731 |
| 2002/0140212 A1 | 10/2002 | Hauer | |
| 2003/0184062 A1 | 10/2003 | Albers et al. | |
| 2004/0012177 A1 | 1/2004 | Sauer | |

(Continued)

FOREIGN PATENT DOCUMENTS

DE    37 33 399 C2    4/1988

(Continued)

*Primary Examiner*—Eric Culbreth
*Assistant Examiner*—Joseph Rocca
(74) *Attorney, Agent, or Firm*—Fitch, Even, Tabin & Flannery (57) ABSTRACT

The invention relates to a generator support for a driver air bag module to be mounted in the steering wheel of a motor vehicle. The generator support includes at least one fastening area for fastening a gas generator to the generator support and at least two horn contacts that can be brought into electrical contact with each other in order to trigger an acoustic horn signal in a mounted state of the generator support together with the driver air bag module in a motor vehicle. In one form, one of the horn contacts is electrically grounded in the mounted state of the generator support and the fastening area is adapted and positioned relative to the grounded horn contact in such a manner that, when the gas generator is fastened to the fastening area of the generator support as prescribed, an electrical contact is established between the grounded horn contact and the gas generator.

20 Claims, 6 Drawing Sheets

U.S. PATENT DOCUMENTS

2004/0046367 A1* 3/2004 Schneider et al. ........ 280/728.2
2006/0006630 A1 1/2006 Schwarz

FOREIGN PATENT DOCUMENTS

| | | |
|---|---|---|
| DE | 201 05 733 U1 | 11/2001 |
| DE | 202 10 372 U1 | 10/2002 |
| DE | 696 11 566 T3 | 4/2004 |
| DE | 102 54 161 A1 | 6/2004 |
| DE | 696 11 566 T4 | 9/2004 |
| DE | 20 2004 010 785 U | 12/2004 |
| EP | 0 739 786 B2 | 10/2003 |
| WO | 03101789 A1 | 12/2003 |

* cited by examiner

GENERATOR SUPPORT FOR A DRIVER AIR BAG MODULE TO BE MOUNTED IN THE STEERING WHEEL OF A MOTOR VEHICLE

CROSS-REFERENCE TO RELATED APPLICATIONS

This is a Continuation of prior PCT Application No. PCT/DE2006/000079, filed Jan. 16, 2006, which claims priority to German Patent Application No. DE 10 2005 002 945.0, filed Jan. 18, 2005. All of these prior applications are hereby incorporated by reference in their entirety.

FIELD OF THE INVENTION

The invention relates to a generator support for a driver airbag module to be mounted in the steering wheel of a motor vehicle, and to a driver airbag module.

BACKGROUND OF THE INVENTION

It is known to integrate, in steering wheels of motor vehicles, what is referred to as a driver airbag module which is mounted as an individual constructional unit into the steering wheel and comprises a multiplicity of individual structural elements and a plurality of functions. The main function of a driver airbag module of this type is, in the event of a crash, to provide an airbag filled with gas between a driver of the motor vehicle and the steering wheel.

For this purpose, the driver airbag module has a gas generator and an airbag which, in the event of a crash, is filled with gas by the gas generator. The gas generator is stabilized and fastened by means of a generator support which has at least one fastening region at which the gas generator is fastened to the generator support by means of a screw connection, for example.

It is known from DE 696 11 566 T4 to integrate two horn contacts into the driver airbag module which, when pressure is exerted on the steering wheel in the direction of the steering column, are brought into electric contact with each other and thereby trigger an acoustic horn signal. If the pressure on the steering wheel diminishes, then the horn contacts move out of this contact position into a normal position in which there is no electric contact between the horn contacts.

A spring mechanism is provided for this. The horn contacts are arranged on the generator support of the driver airbag module and are pressed onto each other on said generator support by the actuation of the horn.

SUMMARY OF THE INVENTION

It is the object of the present invention to improve a generator support for a driver airbag module, with the intention being for the generator support to be distinguished in particular by an increased degree of integration.

This object is achieved according to the invention by a generator support with the features described hereinafter.

One of the at least two horn contacts that has the generator support is electrically grounded when the generator support is mounted. In this case, mounted means that the generator support is mounted into a driver airbag module and this driver airbag module is mounted into the steering wheel of a motor vehicle, so that the horn contact is grounded via a component of the motor vehicle or is situated on an electrical ground. The fastening region of the generator support is designed in such a manner and is positioned relative to the grounded horn contact in such a manner that, if the gas generator is fastened to the fastening region of the generator support as prescribed, an electric contact connection is produced between the grounded horn contact and the gas generator. The gas generator is therefore grounded via the grounded horn contact. The horn contact is referred to as "grounded" even if actually electrically grounded only when mounted itself A generator support of this type has the advantage of providing, for the gas generator, a connection to ground which is distinguished by a high degree of integration. The gas generator does not require any extra cabling, which reduces the number of structural elements required and reduces the production costs.

A grounding of the gas generator is important in terms of safety, since the gas generator could otherwise statically charge up during driving of the motor vehicle, which, under some circumstances, could trigger the igniting of an ignition mechanism for the gas generator and would therefore cause an unintentional inflation of the airbag during the journey.

In a preferred embodiment, in order to fasten the gas generator to the fastening region of the generator support, an electrically conductive fastening means is provided. When mounted, the fastening means is connected in an electrically conductive manner to the grounded horn contact. For example, the fastening means can be designed as a screw, as a flange of the generator or as a latching hook. The connection to ground and contact connection of the grounded horn contact therefore take place, as it were, indirectly via the fastening means.

The grounded horn contact preferably has a thickened portion and/or widened portion on which, when fitted, a mechanical pressure of the gas generator or of the fastening means acts. In this case, an electric contact is produced between the gas generator and the grounded horn contact. The widened portion or thickened portion increases the contact point between the gas generator and the grounded horn contact, which improves the contact connection.

In a particularly preferred embodiment, the fastening region has an opening which, when mounted, is penetrated by the fastening means. The opening is formed in the generator support, so that the fastening means, when mounted, reaches through the opening as far as to that side of the generator support which lies opposite the gas generator. As a result, firstly, a mechanically particularly favorable fastening possibility is provided and, secondly, it is possible for the connection of the gas generator to ground to take place at the horn contact which is arranged on that side of the generator support which is opposite the gas generator.

In this case, a screw with a nut is provided as the preferred fastening means. The grounded horn contact is positioned so closely adjacent to the opening of the fastening region that, when mounted, there is an electric contact between the nut of the fastening means and the grounded horn contact. The horn contact is pressed here against the generator support, for example by means of the nut, as a result of which a mechanical pressure is exerted by the nut on the horn contact which brings about an interference-free electric contact connection.

The generator support is preferably designed as an electric insulator, for example made of plastic. This prevents the horn contacts of the generator support when in contact with the generator support, being undesirably electrically connected to other components, such as, for example, to each other. In this embodiment, the horn contacts can be arranged on mutually opposite sides of the generator support and can make contact with the generator support. The generator support also serves here as a support of the horn contacts. In this embodiment, a plastic encapsulation of the horn contacts by injection molding is not necessary, since there is no risk of an unintentional mutual contact connection, since the horn contacts are separated from each other by the generator support. As a result, production costs of the generator support are lowered.

The horn contacts are preferably designed as electrically conductive contact plates which are elastically deformed and are pressed onto each other during the horn-sounding operation. In this case, the horn contacts may be of planar design or may be only partially composed of strip-shaped plates. The contact plates are advantageously designed essentially in the form of a U-shaped frame of contact plate strips. The U-shape permits simplified insertion of the contact plate into the generator support with the open U-side in front. The central free region of the frame prevents an inflow opening of the generator support for gas flowing into the airbag from the gas generator being covered by the contact plate.

In a particularly preferred embodiment, one of the horn contacts can be at least partially elastically deformed by pressure being exerted to trigger the horn signal, such that it makes electrical contact with the other horn contacts. The horn contacts, which, in the normal position, are arranged at a distance from each other, trigger a horn signal by the electric contact with each other. Thus, for example, a part of a first horn contact is bent onto another horn contact, for example at a region of the horn contact which protrudes laterally over the generator support or though a special opening in the generator support. The elasticity of the deformation ensures that, when the exertion of pressure is diminished, the horn contacts automatically move again into the contact-free normal position.

It is preferably provided that a projection of the steering wheel skeleton of the steering wheel, into which the driver airbag module is to be inserted together with the generator support, has a projection. When pressure is exerted to trigger the horn signal, this projection causes the elastic deformation of the horn contact by the projection pressing onto the horn contact. This can take place, for example, by the driver airbag module being pressed together with the generator support onto the projection of the steering wheel skeleton or the projection being pressed onto the elastically deformable horn contact by means of an actuating lever.

A cable or an electric contact region is advantageously provided for the grounded horn contact, when mounted, which is used to make an electric contact connection with the steering wheel skeleton, as a result of which the horn contact is electrically grounded. This is a particularly simple method in order to provide a connection to ground for the grounded horn contact.

In a preferred embodiment, the horn contacts are fastened in a frictional and/or form-fitting manner to the generator support. For example, ultrasonically welded domes or screws serve for the fastening. As a result, the horn contacts are fixed and positioned in their normal position.

Furthermore, the object according to the invention is also achieved by a driver airbag module which has a generator support according to the invention.

BRIEF DESCRIPTION OF THE DRAWINGS

The invention is explained in more detail below with reference to exemplary embodiments illustrated in the figures, in which.

Mutually corresponding and similar features have the same reference numbers in the figures.

DETAILED DESCRIPTION OF THE PREFERRED EMBODIMENTS

Figure 1:
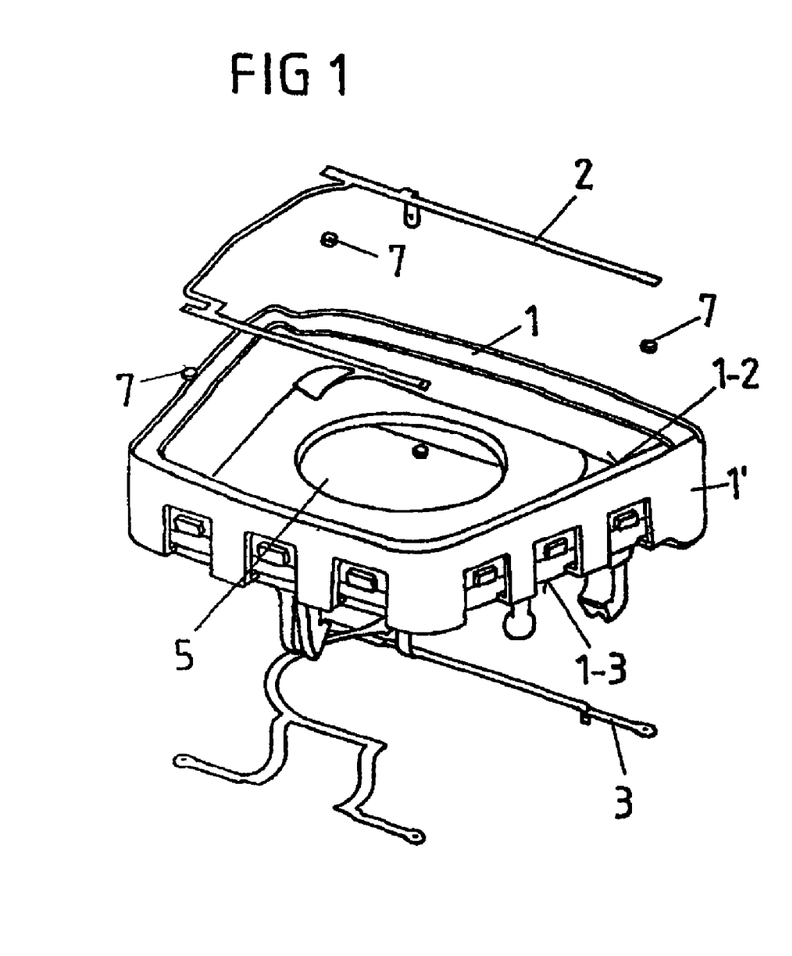
FIG. 1 shows, in an exploded illustration, a generator support with two horn contacts.

FIG. 1 shows the exploded illustration of an embodiment of a generator support 1 according to the invention, and two horn contacts 2 and 3.

The generator support 1 is of essentially planar design and has a square basic shape with rounded corners. In the center of the planar generator support 1, it has a circular opening 5 in the form of a cutout. The opening 5 serves, in the event of a crash, to allow gas to flow out of the gas generator (not illustrated) which is supported by the generator support 1 in to the airbag (not illustrated).

The generator support 1 is provided for the purpose of being inserted as part of a driver airbag module into a steering wheel of a motor vehicle. In this case, the generator support 1 is oriented essentially parallel to the plane which is formed by the spokes of the steering wheel and therefore has a side 1-2 facing the driver and a side 1-3 facing away from the driver. In the mounted position, the side 1-2 facing the driver is arranged higher relative to the vehicle floor than the side 1-3 facing away from the driver, for which reason an upper and lower generator side 1-2 and 1-3, respectively, are also mentioned. The driver airbag module which is bounded by the generator support 1 is arranged in the steering wheel between the generator support 1 and the driver. The side 1-2 facing the driver is therefore also called the inner side of the generator support 1 while the side 1-3 facing away from the driver is also called the outer side of the generator support 1.

Analogously to this, the first horn contact 2 is also referred to by the inner horn contact, since it is arranged on that side 1-2 of the generator support 1 which faces the driver while the outer horn contact 3 is arranged on the opposite side 1-3 of the generator support.

The inner horn contact 2 and the outer horn contact 3 are designed as contact plates which are composed of strip-shaped surfaces and have the form of a U-shaped frame. When the generator support 1 is mounted in the motor vehicle, the horn contacts 2 and 3 are part of an electric circuit to which a horn for triggering an acoustic horn signal is also connected.

Along its essentially square circumference, the generator support 1 has a frame 1' which is widened in relation to the rest of the generator support and bounds the planar generator support on all sides in the manner of a wall. The proportions of the horn contacts 2 and 3 are dimensioned in such a manner that they can be arranged on the generator support 1 within the frame 1'.

Furthermore, spherical spacers 7 are provided to prevent, by means of their position on the generator support 1 and their insulating property, undesired contact connection of the horn contacts.

Figure 2A:
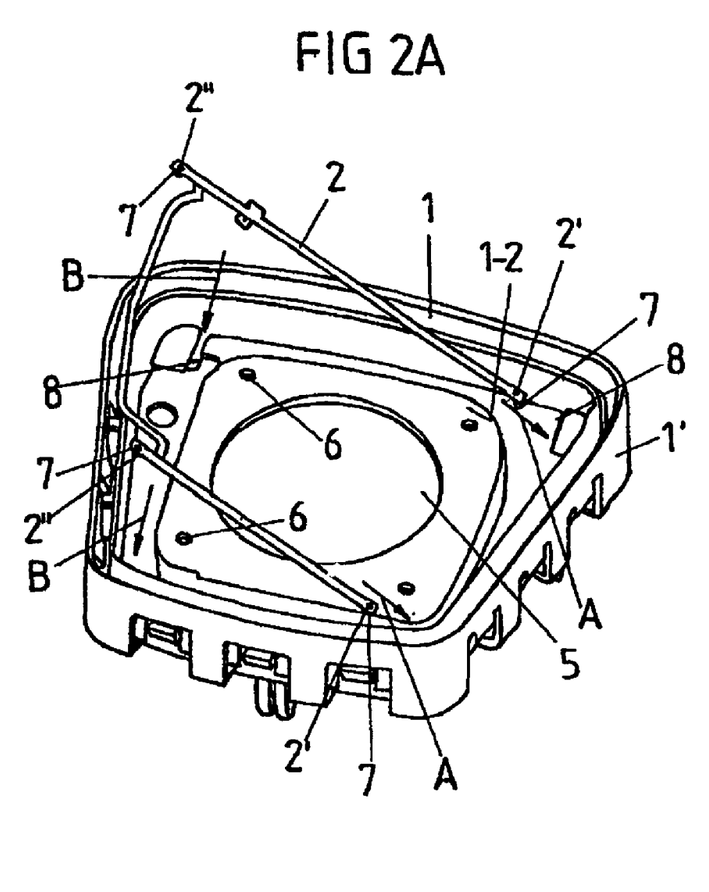
FIGS. 2a-2d show the installation of a horn contact on that side of a generator support which, when mounted, faces a driver of the motor vehicle.
Figure 3A:
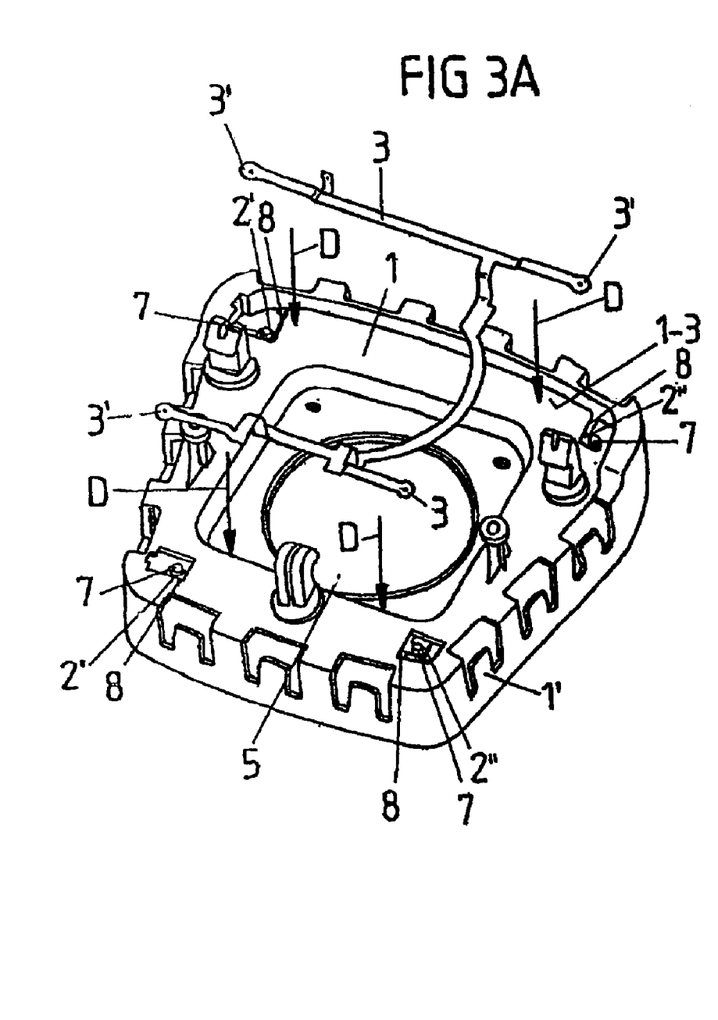
FIGS. 3a, 3b show the installation of a further horn contact on the generator support of FIG. 2 on the side which faces away from the driver.

FIGS. 2 and 3 show the fastening and positioning of the horn contacts 2 and 3. First of all, the spacers 7 are fastened to the four outermost points of extent, the corners 2' and 2" of the U-shaped inner horn contact 2. The inner horn contact 2 is inserted along the arrows A into slot-shaped cutouts (slots 8) in the generator support 1, to be precise with the corners 2', which are situated at the open end of the U-shaped frame of the horn contact 2, in front. If the two corners 2' are introduced into the cutouts of the generator support frame 1, then that end of the horn contact 2 which is situated on the "bulge" of the U-shaped frame is placed onto the generator support 1 along the arrows B (cf. FIG. 2*a*).

The cutouts for receiving the four corners 2' and 2" situated at the corners of the U-shaped frame of the horn contact 2 are designed as slots 8 which receive the inner horn contact 2 in a positioning arranged perpendicularly with respect to their slot and parallel to the surface of the generator support 1. In this case, the corners 2' and 2" of the inner horn contact 2 are pushed by the slots 8 onto the opposite, outer side 1-3 of the generator support 1, with, however, most of the horn contact 2 (namely all of it except for its corners 2' and 2") still being situated on the inner side 1-2 of the generator support 1.

Figures 2B, 2C, 2D:
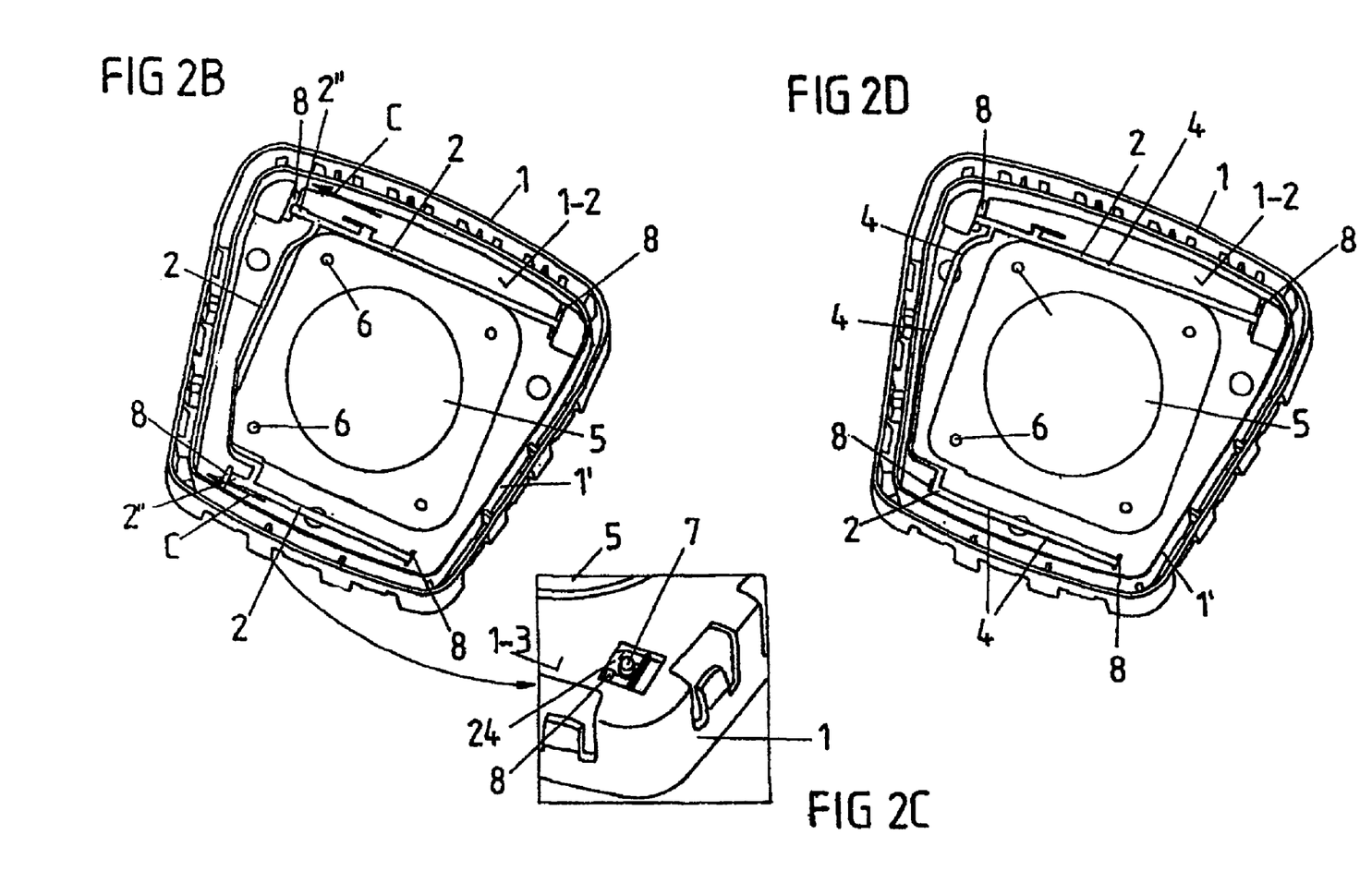

FIG. 2*b* shows how the corners 2", which are situated on the U-bulge, of the inner horn contact 2 are pushed along the arrows C into the slots 8 until they latch into place there and enter into a latching connection. This position is shown in FIG. 2*c* which shows a detail of a schematic illustration of the outer side 1-3 of the generator support 1, on which side the corners 2" of the inner horn contact 2 are arranged in a depression of the slot 8.

By being latched into place, the horn contact 2 is fixed in the position shown in FIG. 2*d*, so that the corners 2' and 2" of the inner horn contact 2, in particular, can no longer slip out of the slots 8 parallel to the generator support 1. The inner horn contact 2 is now situated within the frame 1' and surrounds the opening 5 along three sides of the frame 1'. Since all four corners 2' and 2" are inserted into or under the slots 8, the generator support 1, at this stage of installation, can be rotated, revolved or turned as desired without the inner horn contact 2 being detached from the generator support 1. This facilitates the fastening of the outer horn contact 3.

FIG. 3*a* shows the fastening and positioning of the outer horn contact 3. The outer horn contact 3 is first of all oriented parallel to the outer side 1-3 of the generator support 1 and is moved along the arrows D toward the outer side 1-3 until it rests on the outer side 1-3. In the process, the four corners 3' of the U-shaped outer horn contact 3 are positioned on the outer side 1-3 of the generator support 1 in such a manner that they are separated from the corners 2' and 2" of the inner horn contact 2 only by the spacers 7. The horn contacts 2 and 3 are therefore arranged parallel to each other and at a distance from each other on opposite sides of the generator support 1.

Figure 3B:
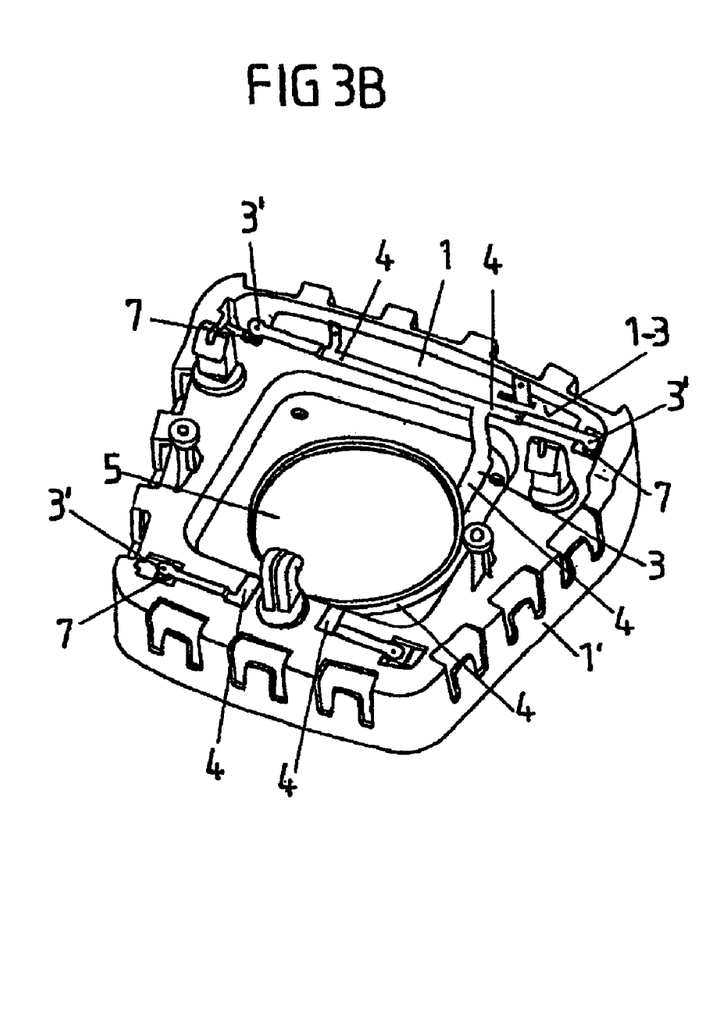

FIGS. 2*d* and 3*b* indicate welding points 4, which are distributed along the horn contacts 2, 3, as the positions at which the horn contacts 2 and 3 are ultrasonically welded by means of domes and are therefore fastened to the generator support 1. Alternatively, the horn contacts 2 and 3 can also be fastened to the generator support 1 by screws. After welding, the horn contacts 2 and 3 are fixed in their position in such a manner that the spacers 7 can be removed without the horn contacts 2 and 3 touching each other.

Figure 4A:
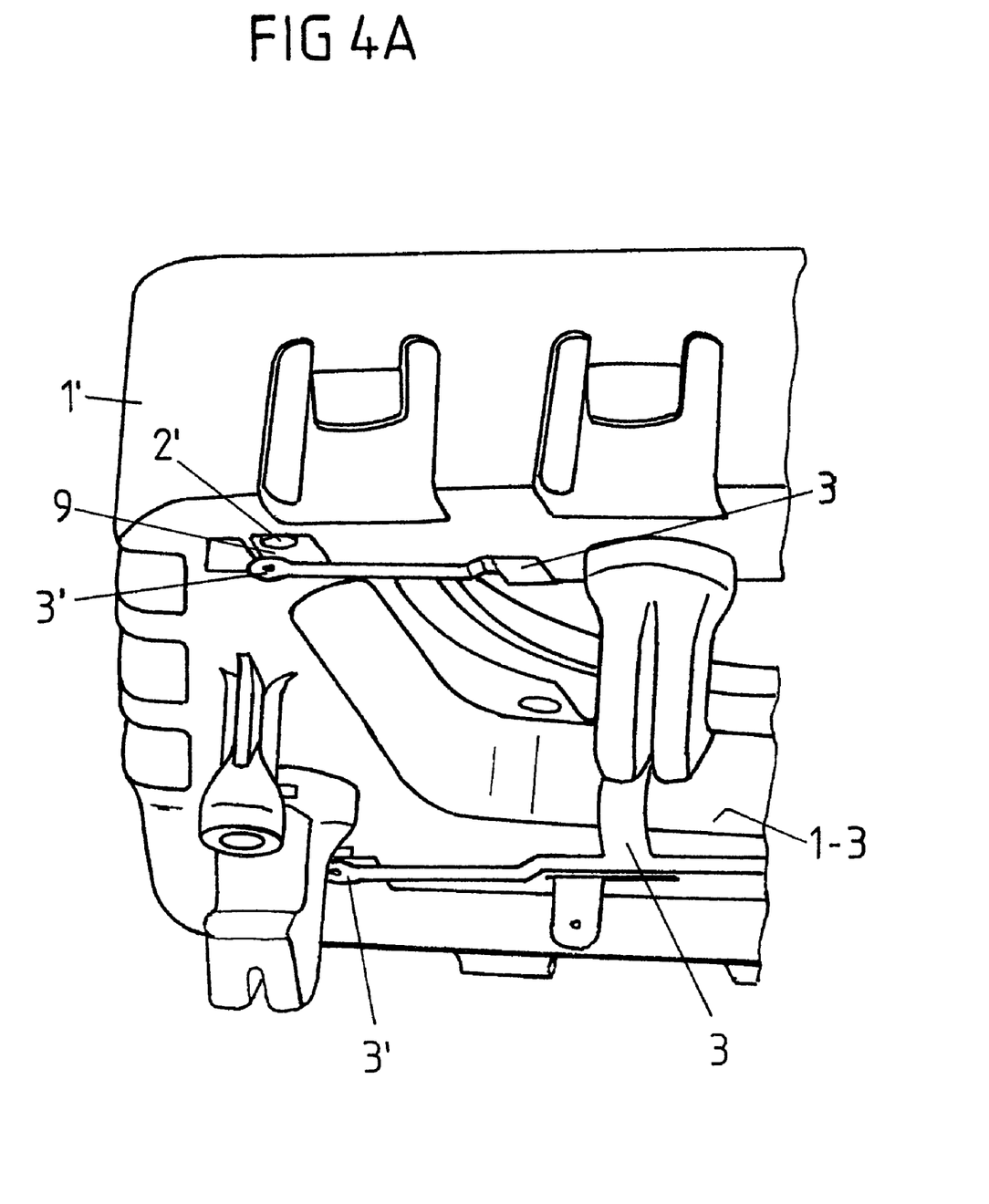
FIGS. 4a-4c show the triggering of a horn signal by contact connection of the two horn contacts.

FIG. 4*a* shows the clearance 9 arising in this case between the corners 3' and 2' or 2" of the outer and inner horn contact 3 and 2. This clearance 9 prevents an electric contact connection of the horn context 2 and 3. The corners 2' and 2" of the inner horn contact 2 and the corners 3' of the outer horn contact 3 are arranged on the same side of the generator support 1, the outer side 1-3. In this case, the corners 3' of the outer horn contact 3 are arranged level with the outer side 1-3 and the corners 2' and 2" of the inner horn contact 2 are offset toward the inner side 1-2 by the clearance 9.

Figure 4B:
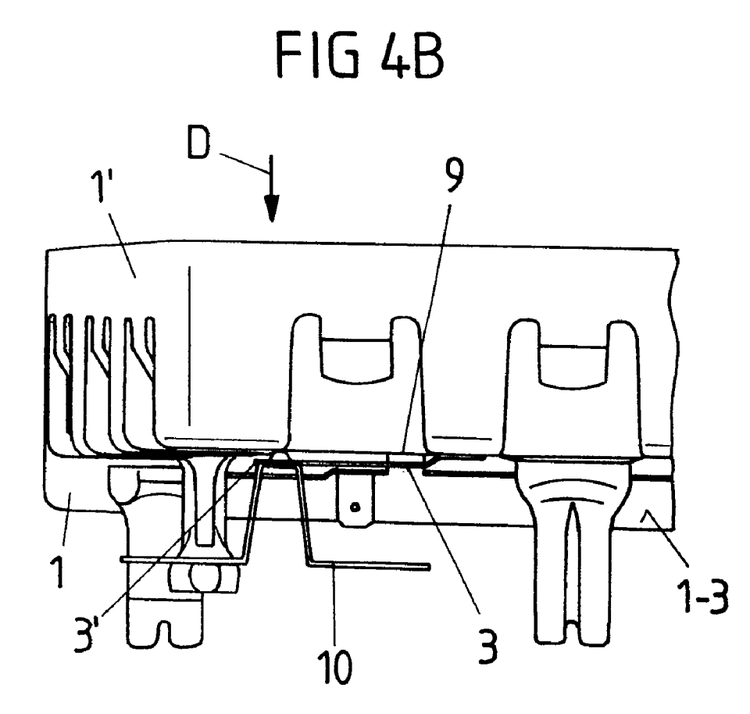

If the generator support 1 is in the mounted position, the corners 3' of the outer horn contact 3 are positioned in such a manner that they bear against projections 10 of the steering wheel skeleton or are closely adjacent to them (cf. FIG. 4*b*).

If the driver of the motor vehicle exerts pressure on that side of the driver airbag module which faces him or on that side 1-2 of the generator support 1 which faces him, then the generator support is pressed in the direction of the steering column onto the driver-side end of the steering column. In the process, the projections 10 move toward the outer corners 3' of the outer horn contact 3 and press it against the outer corners 2' or 2" of the inner horn contact 2, in which case the outer corners 3' of the horn contact 3 are elastically deformed (cf. FIG. 4*c*). By means of the electric contact of the two horn contacts 2 and 3, an acoustic horn signal is triggered by a mechanism (not illustrated specifically). The driver of the motor vehicle can therefore trigger the horn by pressing against predetermined regions of the steering wheel in the direction of the steering wheel axis.

Figure 5A:
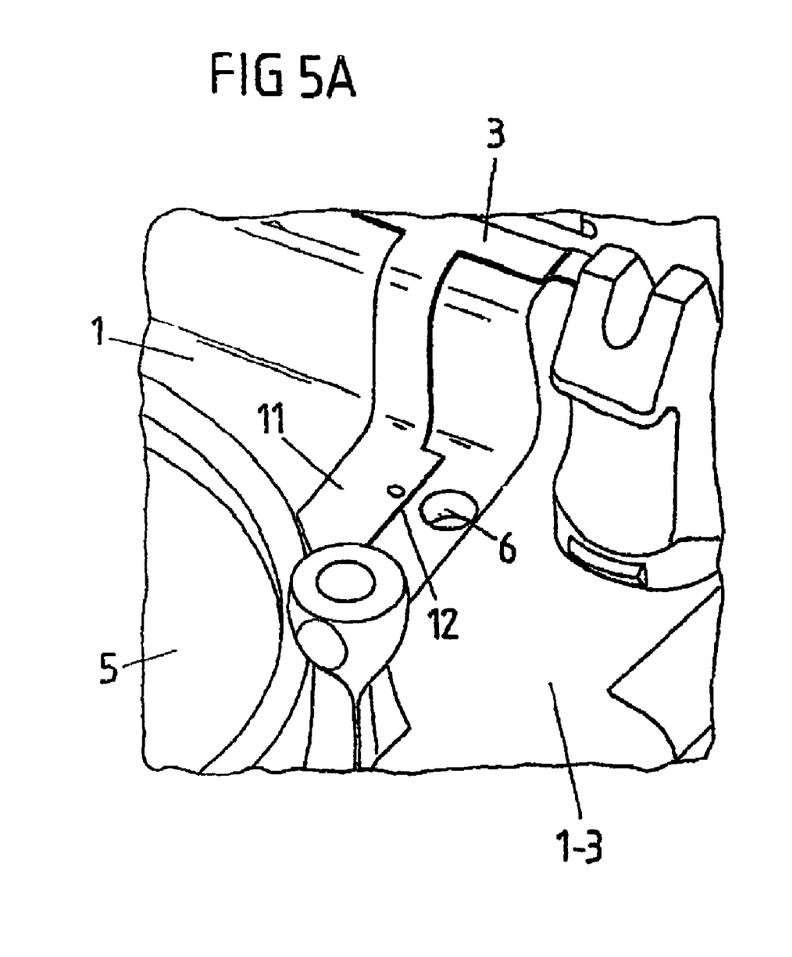
FIGS. 5a, 5b show the connection of a generator to ground by electric contact connection of a grounded horn contact by means of a conductive fastening means.

FIG. 5*a* shows a detail of the outer side 1-3 of the generator support 1 with horn contacts 2 and 3 already fitted. A part of the outer horn contact 3 can be seen that runs along the outer side 1-3 of the generator support 1 and runs closely adjacent to a fastening region 6 for the gas generator, which is designed in the form of a circular opening. In this case, the opening in the fastening region 6 has an inside diameter which corresponds to the outside diameter of a screw. At the point of the horn contact 3 which is most closely adjacent to the fastening region 6, the contact plate of the horn contact 3 has a widened portion 11 and a hill-shaped thickened portion 12.

Figure 5B:
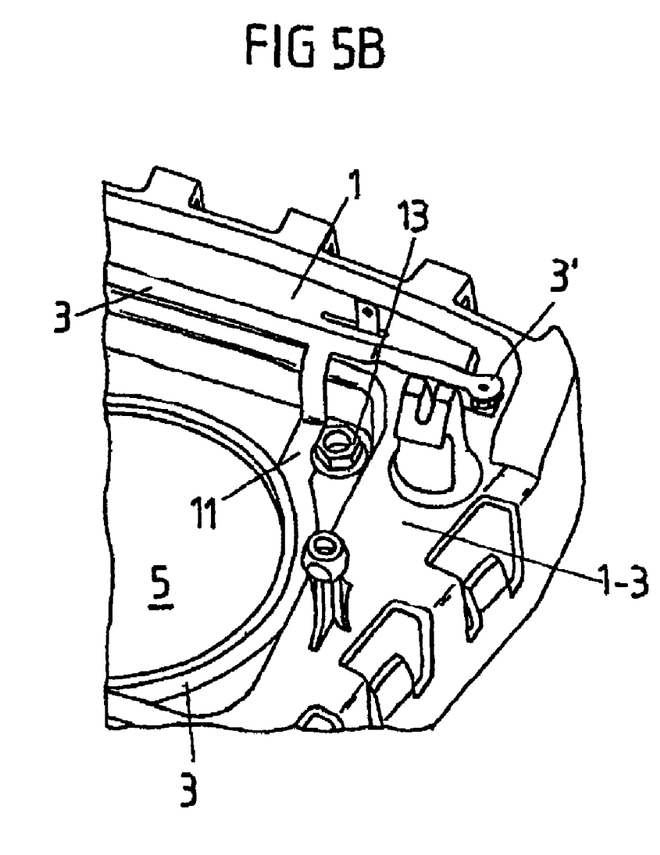

In order to fasten the gas generator (not illustrated), a screw is guided through the opening of the fastening region 6 from the inside 1-2 to the outside 1-3 of the generator support 1 and is fixed on the outside 1-3 by a nut 13 (cf. FIG. 5*b*). When the nut 13 is screwed tightly onto the screw (not illustrated), a mechanical pressure is exerted onto the thickened portion 12 and widened portion 11 of the horn contact 3, which pressure presses the latter onto the generator support 1 and at the same time provides an electric contact connection between the outer horn contact 3 and the nut 13. The gas generator is also electrically connected to the contact plate of the horn contact 3 via the nut 13 and the screw (not illustrated) as the fastening means.

When mounted, the outer horn contact 3 is electrically connected to the steering wheel skeleton (not illustrated) by means of wires or similar contact connection points and is grounded. The outer horn contact 3 is therefore also referred to as grounded horn contact 3. When the gas generator is mounted, an electric contact between the grounded horn contact 3 and the gas generator is therefore provided.

In an alternative embodiment, a gas generator is provided which is to be positioned on the outside 1-3 of the generator support 1 and is fastened to the fastening region of the generator support 1 by means of at least one generator flange as the fastening means.

Figure 4C:
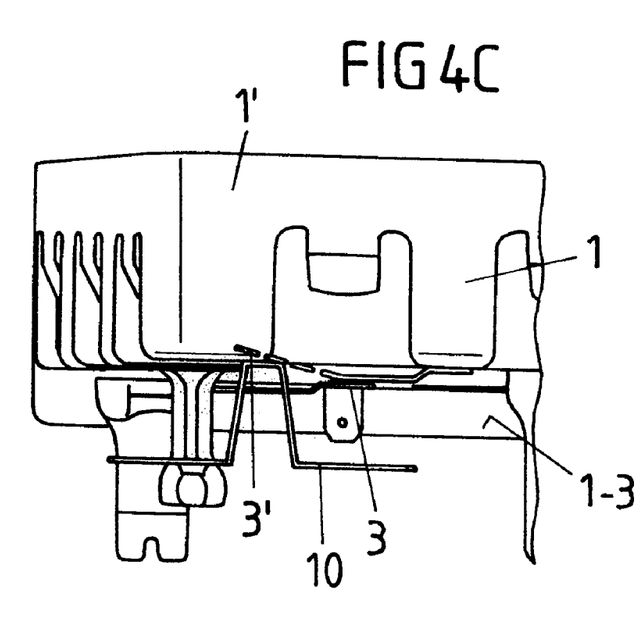

It is likewise possible, in another alternative, not to provide four dome-shaped projections 10 of the steering wheel skeleton, which, when pressure is exerted on the generator support, cause an elastic deformation of the outer corners 3' of the outer horn contact 3, but rather a differing number of projections, but at least one.

What is claimed is:
1. A generator support for a driver airbag module to be arranged in the steering wheel of a motor vehicle, the generator support comprising:
   a generator support body of electrically insulative material, at least one fastening region of the generator support body for fastening a gas generator to the generator support body, at least two electrically conductive horn contacts mounted to the generator support body in spaced relation to each other for being brought into electrical contact with each other in order to trigger an acoustic horn signal when the gas generator is mounted together with the driver airbag module in a motor vehicle, one of the horn contacts provided for the purpose of being electrically grounded when the generator support is mounted, the fastening region being positioned relative to the grounded one of the horn contacts in such a manner that, when the gas generator is fastened to the fastening region of the generator support body, an electric contact connection is produced between the grounded horn contact and the gas generator, and, an electrically conductive fastener for securing the gas generator to the fastening region of insulative generator support body such that the electrically conductive fastener also electrically contacts the grounded one of the horn contacts for electrically connecting the gas generator thereto for grounding thereof.

2. The generator support as claimed in claim 1, characterized in that the grounded horn contact has a thickened portion and/or widened portion on which, when mounted, a mechanical pressure of the gas generator or of the fastener acts, with an electric contact being produced between the gas generator and the grounded horn contact.

3. The generator support as claimed in claim 1, characterized in that the fastening region has an opening which, when mounted, is penetrated by the fastener.

4. The generator support as claimed in claim 3, characterized in that a screw with a nut is provided as the fastener.

5. The generator support as claimed in claim 4, characterized in that the grounded horn contact is positioned so closely adjacent to the opening of the fastening region that, when mounted, there is an electric contact between the nut of the fastener and the grounded horn contact.

6. The generator support as claimed in claim 1, characterized in that a generator flange is provided as the fastener.

7. The generator support as claimed in claim 1, characterized in that the generator support body is designed as an electric insulator made of a plastic.

8. The generator support as claimed in claim 1, characterized in that the horn contacts are arranged on mutually opposite sides of the generator support body.

9. The generator support as claimed in one claim 1, characterized in that the horn contacts are designed as electrically conductive contact plates.

10. The generator support as claimed in claim 9, characterized in that the contact plates are designed essentially in the form of a U-shaped frame.

11. The generator support as claimed in claim 1, characterized in that a horn contact can be at least partially elastically deformed by pressure being exerted to trigger the horn signal, such that it makes electrical contact with the other horn contact.

12. The generator support as claimed in claim 11, characterized in that a projection of a steering wheel skeleton is provided which, when pressure is exerted to trigger the horn signal, causes the elastic deformation of the horn contact.

13. The generator support as claimed in claim 1, characterized in that the grounded horn contact has a cable or an electric contact region which is provided for the purpose of, in the mounted position, electrically grounding the grounded horn contact by means of an electric contact connection of a steering wheel skeleton.

14. The generator support as claimed in claim 1, characterized in that the horn contacts are connected in a frictional and!or form-fitting manner to the generator.

15. The generator support as claimed in claim 14, characterized in that the horn contacts are fastened to the generator support body by means of ultrasonically welded domes or screws.

16. The generator support as claimed in claim 1, characterized in that the horn contacts are designed such that they are free from encapsulation by injection molding.

17. The generator support as claimed in one claim 1, characterized by contact-making means which, when the generator support is mounted, provide an electrical connection to ground of the grounded horn contact.

18. The generator support as claimed in claim 1 in combination with a driver airbag module to be mounted in the steering wheel of a motor vehicle to the fastening region of which the gas generator is fastened.

19. The combination as claimed in claim 18, characterized in that, when the driver airbag module is mounted in the motor vehicle, the horn contacts can be connected to an electric circuit to which a horn for triggering the acoustic horn signal is also connected.

20. A method for fastening a gas generator to a generator support, the method comprising:
providing a generator support having a body of insulative material with at least two horn contacts mounted to the generator support body which can be brought into electric contact with each other in order to trigger an acoustic horn signal when the generator support is mounted together with the driver airbag module in a motor vehicle,
grounding one of the at least two horn contacts, and
fastening the gas generator to the generator support body in such a manner that an electric contact connection is produced between the grounded horn contact and the gas generator that are both mounted to the insulative generator support body.

* * * * *